No. 893,875. PATENTED JULY 21, 1908.
F. SCHNEIDER.
DRILL PRESS CHUCK.
APPLICATION FILED DEC. 14, 1906.
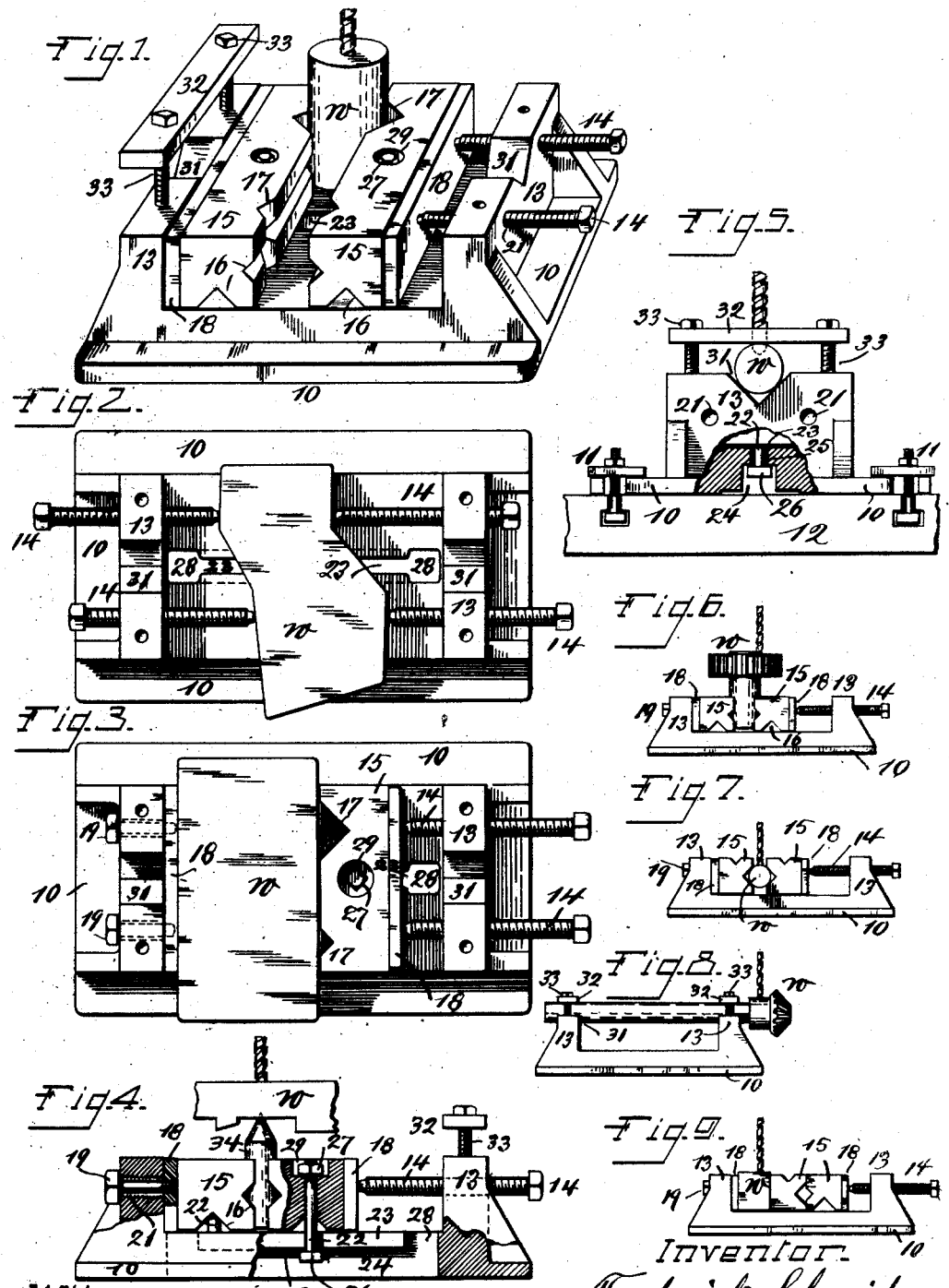
Witnesses.
Homer Bradford.
F. LeBeau.
Inventor.
Frederick Schneider
by C. Spengel atty.

UNITED STATES PATENT OFFICE.

FREDERICK SCHNEIDER, OF CINCINNATI, OHIO.

DRILL-PRESS CHUCK.

No. 893,875.    Specification of Letters Patent.    Patented July 21, 1908.

Application filed December 14, 1906. Serial No. 347,740.

*To all whom it may concern:*

Be it known that I, FREDERICK SCHNEIDER, a citizen of the United States, and residing at Cincinnati, Hamilton county, State of Ohio, have invented certain new and useful Improvements in Drill-Press Chucks; and I do declare the following to be a clear, full, and exact description thereof, attention being called to the accompanying drawing, with the reference characters marked thereon, which form also a part of this specification.

This invention relates to improvements in chucks, meaning thereby devices which are used for holding work in position while operated upon by a machine-tool.

This particular chuck is principally intended for use in connection with drill-presses, tapping machines etc., but may also be used otherwise, as for instance in connection with planers and milling machines.

The object of the invention is to provide a device whereby work may be quickly and firmly secured in position, particularly when of irregular shape, to be worked upon by the machine-tool.

The invention consists of the chuck as shown and described and claimed hereinafter.

The accompanying drawing shows the chuck as used in connection with a drill-press for boring or tapping.

Figure 1, is a perspective view, the chuck being arranged to hold round work while being acted upon endwise or axially. Fig. 2, is a top-view and shows it arranged for holding a piece of work of irregular shape. Fig. 3, in a similar view shows it for holding a piece of flat-work of regular shape. Fig. 4, is a side-view with parts broken away and shows another manner of supporting a piece of irregular shape. Fig. 5, shows in an end-view with parts broken away, round work held to be worked upon at right angles to its axis. Figs. 6, 7, 8, and 9, are side-views at reduced scale and illustrate each a different manner of use.

The base of the chuck is of rectangular shape and projects on all four sides forming flanges 10, which permit engagement by the usual holding devices, or dogs 11, whereby the chuck is held on the table 12, of the particular machine-tool on which it is used. See Fig. 5. Such an attachment might be required when used in connection with a planer, while in case of use on a drill-press, it becomes unnecessary, since the weight of the chuck is sufficient to hold it in place, there being no lateral action tending to displace it. Near opposite ends of this base there are two vertical cheeks 13,—13, which are tapped to receive each two clamping screws 14,—14, and which with this base, and its flanges form an integral casting. The space between these cheeks is used to receive the work which may be held therein directly by means of screws 14, as shown in Fig. 2, or by the intermediate use of V-blocks 15. These blocks have complementary V-grooves, which, when arranged to be opposite each other, serve to firmly grip the work, particularly such which is cylindrical while being held against such work by the clamping screws 14. These grooves may be arranged to suit particular requirements and are of different sizes, that is depth and width, to accommodate different sizes of work. There are horizontal grooves 16, and vertical grooves 17. The use of the vertical grooves of the V-blocks is shown in Figs. 1, 4, and 6. The use of the horizontal grooves is shown in Fig. 7. The V-blocks are also used in connection with straight work when they serve to fill up the space between the cheeks, to reduce the manipulation of the clamping-screws. Fig. 3, shows one block in use, in Fig. 9, the two blocks are shown as used to fill up the space.

18 are wearing-plates, to prevent wear and injury to the work to be held, or to the V-blocks and caused by the ends of the clamping-screws digging into the same. These plates may be reversed when worn on one side and also independently renewed without affecting the chuck. One of these plates serves also to protect that one of the cheeks, against which the work is pressed, or which receives the pressure from the clamping-screws seated in the opposite cheek, note Figs. 1, 3, 4, 6, 7, and 9. Ordinarily this one plate remains in position and is held against the particular adjacent cheek by screws 19,—19. It is removed when work is to be done as shown in Figs. 2, 5, or 8. To facilitate its quick removal or attachment openings 21 are used to receive screws 19, which latter are passed through these openings, clamping-screws 14 having first been removed. They are of smaller diameter however and do not engage the threads in these openings, through which they pass without engagement. They are tapped however into plate 18, so that a few turns only of screws 19, are required to disengage or connect this plate. The V-blocks are held in place between the cheeks and down on the base in their adjusted position whenever necessary, by tie-bolts 22, which are carried by these blocks and extend below them through a slot 23, provided in the base of the chuck and terminating between the cheeks. This slot is entirely open, that is it extends completely through the base so that chips and shavings may readily drop through whereby the device is always kept clear. Its lower part is enlarged in width as shown at 24, to form shoulders 25, against which heads 26, of these bolts bear when they are drawn tight by nuts 27. At opposite ends near the adjacent cheeks slot 23, is enlarged by removal of shoulders 25 thereat as shown at 28, to permit quick removal upwardly of the tie-bolts whenever it is necessary to clear the space between the cheeks for purposes as shown for instance in Figs. 2, 3, or 8. The bolts may be re-inserted from above with equal facility and without lifting the chuck. Nuts 27, occupy counter-sinks 29, in the upper side of the V-blocks, so as to be out of the way. These bolts serve also to hold the V-blocks in position on the base when they are adjusted against the work by the clamping screws. The nuts on them are merely loosened at the time, sufficiently to permit said blocks to slide to their adjusted positions, after which they are tightened again.

In Figs. 5, and 8, I illustrate another use for the chuck where round work of more extensive length is to be held. Such work rests on top of cheeks 13,—13, and across the space between them, this space having first been cleared as shown in Fig. 8. The work rests in V-grooves 31, and is held therein by bars 32, held down by screws 33. I will now briefly repeat a description of the possible different ways in which this chuck may be used, the work being in each case indicated by $w$.

Fig. 1, shows a round piece which might be a pin, short shaft, and which is placed to be drilled endwise or axially. It is held between the V-blocks, occupying a complementary set of the vertical grooves therein.

Fig. 2, shows a piece of work of irregular shape, the V-blocks are dispensed with since they cannot be used, and everything in the space between the cheeks is removed. The work is held by clamping-screws 14 direct, which are adjusted, each to meet the configuration of the work.

Fig. 3, shows a piece of work of regular shape. Its width being limited, one of the V-blocks is used as a spacer to fill up.

Fig. 4, shows the chuck used to hold a center-piece between the V-blocks, the work itself, being too irregular to be supported on the table, rests on this center-piece which latter is thus used to support the work and to locate its position with reference to the drill-point. The work in this case may be held by hand. Any work which for drilling has to be held between centers, may be supported in this manner, particularly shafts for the purpose of being provided at opposite ends with the center holes which receive the lathe-center.

Fig. 5, shows round work held on top of the cheeks in a horizontal position to be drilled sidewise. Everything in the space between the cheeks is removed in this case.

Fig. 6, shows a use similar to the one shown in Fig. 1, the V-block being used to hold the shaft and pinion for drilling a keyway.

Fig. 7, shows a use similar to the one shown in Fig. 5, a round piece of work being held in a horizontal position, the V-blocks being used however, it being held in a set of complementary horizontal V-grooves in said blocks.

Fig. 8, shows a use similar to the one shown in Fig. 5, work being supported in a horizontal position on top of the cheeks and the space between them is cleared.

Fig. 9, shows flat regular work, the V-blocks being merely used as spacers to lessen manipulation of the clamping-screws.

The chuck may of course be used in many other connections which readily suggest themselves to the practical machinist. By the various means shown, it may always be adjusted to fit the shape of the work. Irregular work of all kinds, crank-shafts, wrist-pins, tool-handles for lathes, drill-press handles and levers, tapering work, rough castings may readily be held analogous to the methods indicated in Figs. 2, and 4. The work is quickly and readily secured, saving much time as against the usual methods of holding work. At the same time it is securely held so as to prevent injury to tools and breaking of drills, taps, and reamers.

All work-holding surfaces and work-receiving grooves of the work-holding parts are arranged and planed so as to be either at right angles or parallel to the edges of the flanges of the base. This facilitates quick adjustment of the work on the table of a machine-tool since the edge of any of the flanges may be readily brought into a certain position with reference to one of the edges of the table, that is parallel or at right angles thereto, whereby the work is at once placed in proper position with reference to the movement or position of the tool.

Having described my invention I claim as new:

1. A work-holding chuck consisting of a base which has integral cheeks at opposite ends, arranged parallel to each other and provided with screw-threaded openings adapted to receive clamping-screws, said base having also a longitudinal slot between these cheeks, the lower part of which slot is enlarged, workholding-blocks fitted to this base which have vertical V-grooves in their sides opposite each other, and vertical bolt-holes counter-sunk at their upper ends, tie-bolts for these blocks, the heads of which occupy the enlarged part of the slot while their upper ends extend into the counter-sunk parts mentioned, and nuts occupying these parts of the bolt-holes and engaging the ends of the bolts therein to hold the blocks down on the base.

2. A workholding chuck consisting of a base which has integral cheeks at opposite ends, arranged parallel to each other and provided with screw-threaded openings adapted to receive clamping screws, said base having also a longitudinal slot between these cheeks which slot extends through the entire thickness of the base to permit waste to pass out and is enlarged in its lower part so as to form shoulders, a part of this latter at both ends of the slot being omitted so as to enlarge the slot thereat, workholding blocks fitted to this base, and tie-bolts for them, the heads of which occupy the enlarged part of the slot in the base and are held by the shoulders formed in the upper part of the slot, said bolts being removable through the enlarged ends of the slot.

3. A chuck consisting of a base having a longitudinal slot and provided with cheeks at opposite ends of this slot which have alined V-grooves in the center of their upper side, tapped openings, one on each side of each V-groove, sunk in from the top of these cheeks and additional tapped openings in these cheeks below their top and arranged to extend through them at right angles.

In testimony whereof, I hereunto set my signature in the presence of two witnesses.

FREDERICK SCHNEIDER.

Witnesses:
C. SPENGEL,
T. LE BEAU.